July 14, 1964 A. ROTHGART 3,140,781
COMBINATION MIRROR AND HOLDER
Filed May 21, 1963 2 Sheets-Sheet 1

INVENTOR.
ALBERT ROTHGART
BY *Felshin and Rosen*
ATTORNEYS.

July 14, 1964 A. ROTHGART 3,140,781
COMBINATION MIRROR AND HOLDER
Filed May 21, 1963 2 Sheets-Sheet 2

INVENTOR
ALBERT ROTHGART
BY
Felshin and Rosen
ATTORNEYS.

United States Patent Office 3,140,781
Patented July 14, 1964

3,140,781
COMBINATION MIRROR AND HOLDER
Albert Rothgart, Brooklyn, N.Y., assignor to Visionade Manufacturing Co., Inc., Brooklyn, N.Y., a corporation of New York
Filed May 21, 1963, Ser. No. 281,952
15 Claims. (Cl. 211—13)

This invention relates to mirrors for mounting on the sun visor of an automotive vehicle or similar mounting member.

An object of the invention is to provide a mirror of the type indicated with means for holding a series of articles against said sun visor or mounting member in a manner whereby said holding means may be readily moved into hidden position behind the mirror when not in use.

Another object is generally to provide an improved mirror and holder for use as a sun visor mirror or as a vanity mirror, or both.

The above and other objects, features and advantages of the invention will be more fully understood from the following description of the invention considered in connection with the accompanying illustrative drawing in which, FIG. 1 is a front elevational view of a mirror and holder in accordance with the present invention in operative holding position on the sun visor of an automotive vehicle;

Figure 1:
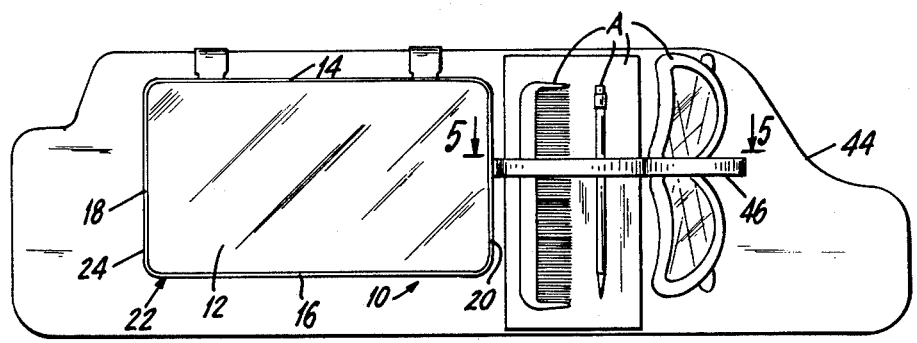
Figure 5A:
FIG. 5A is a vertical sectional view, on a larger scale, taken on line 5A—5A of FIG. 2.

Referring now to the drawing in detail and first to FIGS. 1 to 5A, the combination mirror and holder 10 comprises a rectangular shaped glass mirror 12 having an upper edge 14, lower edge 16, and laterally spaced side edges 18 and 20. A sheet metal backing member 22 is secured to the back of the mirror and has a marginal edge 24 which extends along the peripheral edge of the mirror and forms a frame therefor. The back of the mirror is secured to the inner surface 26 of the backing member by any suitable means, for example by strips 28 of adhesive which may be provided along inner surface 26, adjacent the upper and lower edges 30 and 32, respectively, of the backing member.

Figure 4:
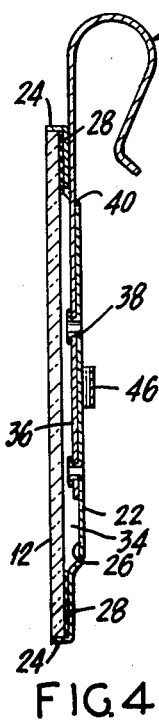
FIG. 4 is a vertical sectional view, on a larger scale, taken on line 4—4 of FIG. 2.
Figure 3:
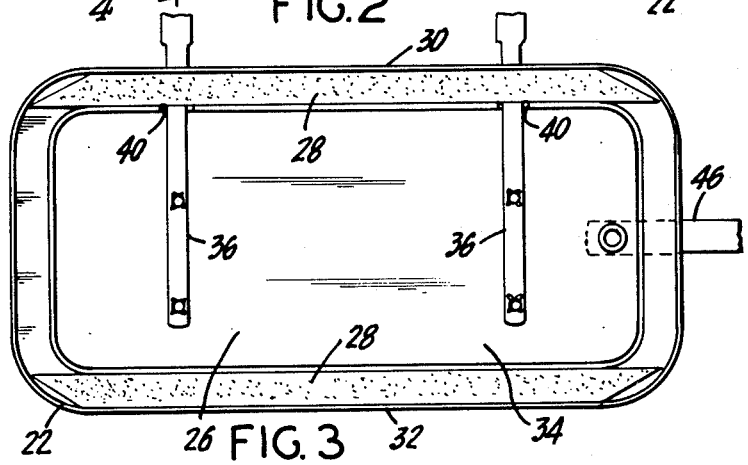
FIG. 3 is a view of the front of the mirror with the glass mirror part removed.

The backing member is provided with a slightly recessed area 34 which imparts rigidity to the sheet metal backing member. A pair of laterally spaced spring clips 36 are secured to the backing member by any suitable means. As herein shown, the clips are secured to the backing member by a punching and upsetting operation. More particularly, the clips are punched to form holes 38 and the material of the backing member, adjacent the holes, is upset to overlie the marginal edges defining holes 38, as best seen in FIG. 4.

The clips extend through holes 40 provided in the backing member and project above the upper edge 30 of the backing member. The upper ends of the clips have spring clip parts 42 which extend backwardly and downwardly below the upper edge of the backing member in confronting relation therewith. The clip parts are used for removably securing the mirror and holder 10 to the sun visor 44, as illustrated by FIG. 1.

Figure 2:
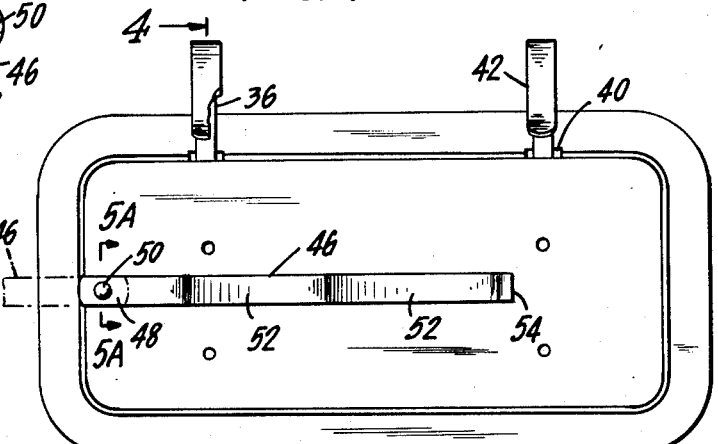
FIG. 2 is a view of the back of the mirror with the holder in inoperative hidden position.

In accordance with the invention, an article holding member 46 is secured to the backing member for movement between holding and non-holding positions. More particularly, the holding member is an elongated strip of spring steel which is pivotally connected at its end 48 to backing member 22 by a pin 50, adjacent side edge 20 of the mirror. The holding member has a length which is less than the length of the mirror so in its inoperative and non-holding position, as illustrated in solid lines in FIG. 2, the member is completely hidden from view behind the mirror. It is moved into operative holding position, as illustrated by FIGS. 1 and 2, by merely swinging it on pin 50 from its position behind the mirror to a position where it extends from side edge 20 of the mirror and is in confronting relation with the surface of the sun visor for resiliently holding the articles A therebetween. It is to be understood that the friction of the pivotal connection of the holding member to the backing member is such that the holding member remains in place in its stored position behind the backing member 22.

Figure 5:
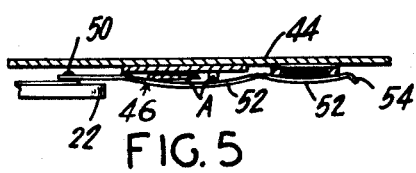
FIG. 5 is a horizontal sectional view taken on line 5—5 of FIG. 1.

As best seen in FIG. 5, the holding member 46 is formed with side-by-side parts 52 which curve inwardly toward the sun visor. These curved parts provide strength and resiliency for the holding member so that the articles are securely but releasably held in position. End 54 of member 46 is curved away from the sun visor to provide ready entry of the different articles, especially maps, between the holding member and sun visor.

Figure 6:
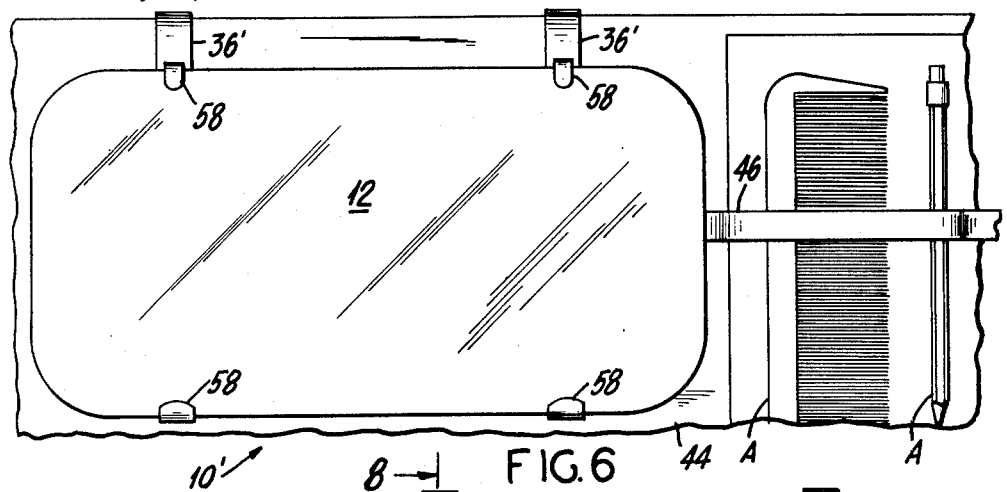
FIG. 6 is a front elevational view of a different form of mirror and holder in accordance with the invention showing the mirror and holder in operative position on the sun visor of an automotive vehicle.
Figure 7:
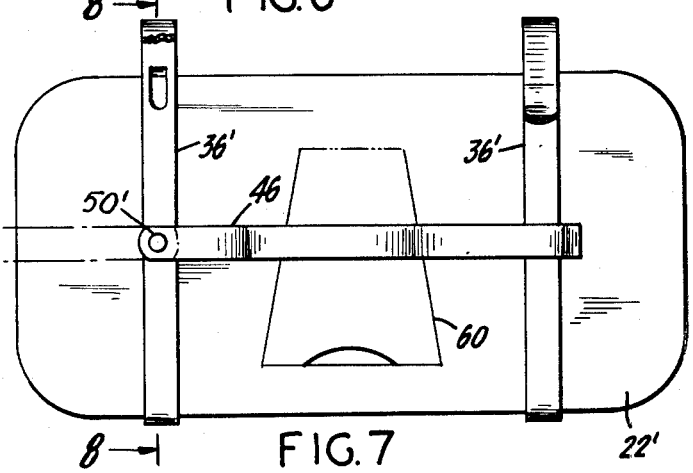
FIG. 7 is a view of the back of the mirror and holder of FIG. 6.
Figure 8:
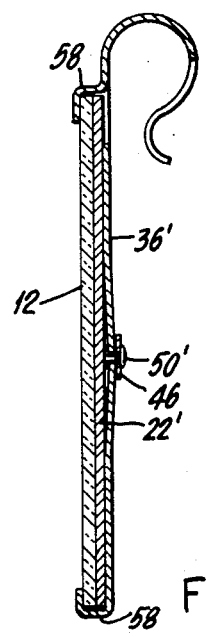
FIG. 8 is a vertical sectional view, on a larger scale, taken on line 8—8 of FIG. 7.
Figure 9:
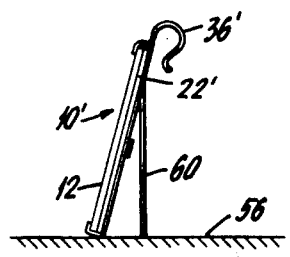
FIG. 9 is a side elevational view showing the mirror and holder of FIG. 6 in operative position on a vanity table.

Referring now to FIGS. 6 to 9, there is shown another form 10′ of the mirror and holder which includes provision for supporting the mirror on a flat surface such as the vanity table top 56 illustrated by FIG. 9. In this form of the invention the mirror is provided with a rectangular cardboard backing member 22′ in lieu of the metallic backing member previously described, and the backing member is held against the back of the mirror by the laterally spaced spring clips 36′. The clips are similar to those previously described but each has, in addition, hook parts 58 at their respective upper and lower ends which overlie and engage the upper and lower edges of the backing member 22′ and mirror 12 to hold them together, as illustrated by FIGS. 6 and 8. The holding member 46 is secured to one of the clips by a pin 50′ for swinging movement between operative and inoperative positions, as previously described. The backing member has a scored part 60 which can be pulled away from the member and provide a stand therefor, illustrated in FIG. 9.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying ideas or principle of this invention within the scope of the appended claims.

I claim:

1. A combination rigid article and holder comprising, a rigid, generally flat article, an elongated spring holding member, means for attaching said holding member at the back of the article for movement in a plane parallel to and adjacent to said article and in position for movement of said member from an inoperative non-holding position wholly behind and covered by said article, to an operative holding position with part of said member extending beyond an edge of said article, and means attached to said article for mounting the latter on a support disposed in back of and close to said article and holding member and having a portion extending beyond said article, whereby objects may be inserted between said member and said extending portion of said support and beyond said rigid article when said member is in operative position.

2. A combination rigid article and holder as defined in claim 1, wherein said rigid article is a mirror.

3. A combination rigid article and holder as defined in claim 2, wherein said holding member is a metallic spring strip having a pair of parts positioned in side-by-side relation along the length of said strip and curved in a direction toward the back of said mirror.

4. A combination rigid article and holder as defined in claim 2, wherein a metallic backing member is secured to the back of said mirror, and said mounting means comprises a pair of laterally spaced spring clips secured to said backing member.

5. A combination rigid article and holder as defined in claim 2, wherein a non-metallic backing member is positioned at the back of said mirror, and said mounting means comprising a pair of laterally spaced spring clips having parts holding said mirror and backing member together.

6. A combination rigid article and holder as defined in claim 5, and means securing said attaching means for said holding member to one of said clips.

7. A combination rigid article and holder as defined in claim 2, wherein said holding member has a length which is less than the width of said mirror, and said holding member attaching means is positioned adjacent one end of said holding member and adjacent one side edge of said mirror, whereby in the inoperative non-holding position of said holding member, said holding member is hidden behind said mirror and from the view of an observer in front of said mirror.

8. A device adapted to be removably mounted on a visor of a vehicle, said device comprising a rigid, generally flat article, means attached to said article to engage an edge of said visor to hold said article flat against the front of said visor, an elongated member pivoted to the back of said article, adjacent one end of said article about an axis perpendicular to said article, and in one inoperative position of said member, said member being located wholly behind said article so as not to be viewable from the front, and said member being swingable through an angle of about 180° from its inoperative position to an operative position, to project beyond an edge of said article whereby objects may be inserted between the projecting portion of said member and a portion of said visor extending beyond said article.

9. A device comprising a rigid, generally flat article, means to removably mount said article on a support, a holding member mounted on the back of said article for movement from an inoperative position wholly hidden behind said article and between said article and support, to an operative position projecting beyond said article so as to overlie a portion of the support beyond said article, whereby objects inserted between the projecting portion of said member and support will be held by said member against said support.

10. The combination of claim 9, said member comprising a strip spring.

11. The combination of claim 9, said member being pivoted to said article for movement on axis perpendicular to said article.

12. The combination of claim 10, said member being pivoted to said article for movement on an axis perpendicular to said article.

13. The combination of claim 9, said mounting means comprising spring clip means on said article extending rearwardly thereof to engage around an edge of said support.

14. The combination of claim 12, said mounting means comprising spring clip means on said article extending rearwardly of said article to engage around an edge of said support.

15. The combination of claim 1, said means for attaching said holding member to said article comprising a pivotal connection on an axis perpendicular to said article, whereby said member may be swung about said pivotal connection from said inoperative to said operative position.

References Cited in the file of this patent

UNITED STATES PATENTS

| | | |
|---|---|---|
| 344,555 | Wood | June 29, 1886 |
| 805,852 | Hall | Nov. 28, 1905 |
| 1,052,062 | Johnson | Feb. 4, 1913 |
| 1,828,456 | Botsford | Oct. 20, 1931 |
| 2,097,419 | Schmidt | Oct. 26, 1937 |
| 2,737,742 | Leigh | Mar. 13, 1956 |